Oct. 24, 1944. H. C. FRATT 2,361,189
REEL SUPPORTING MEANS
Filed June 17, 1943
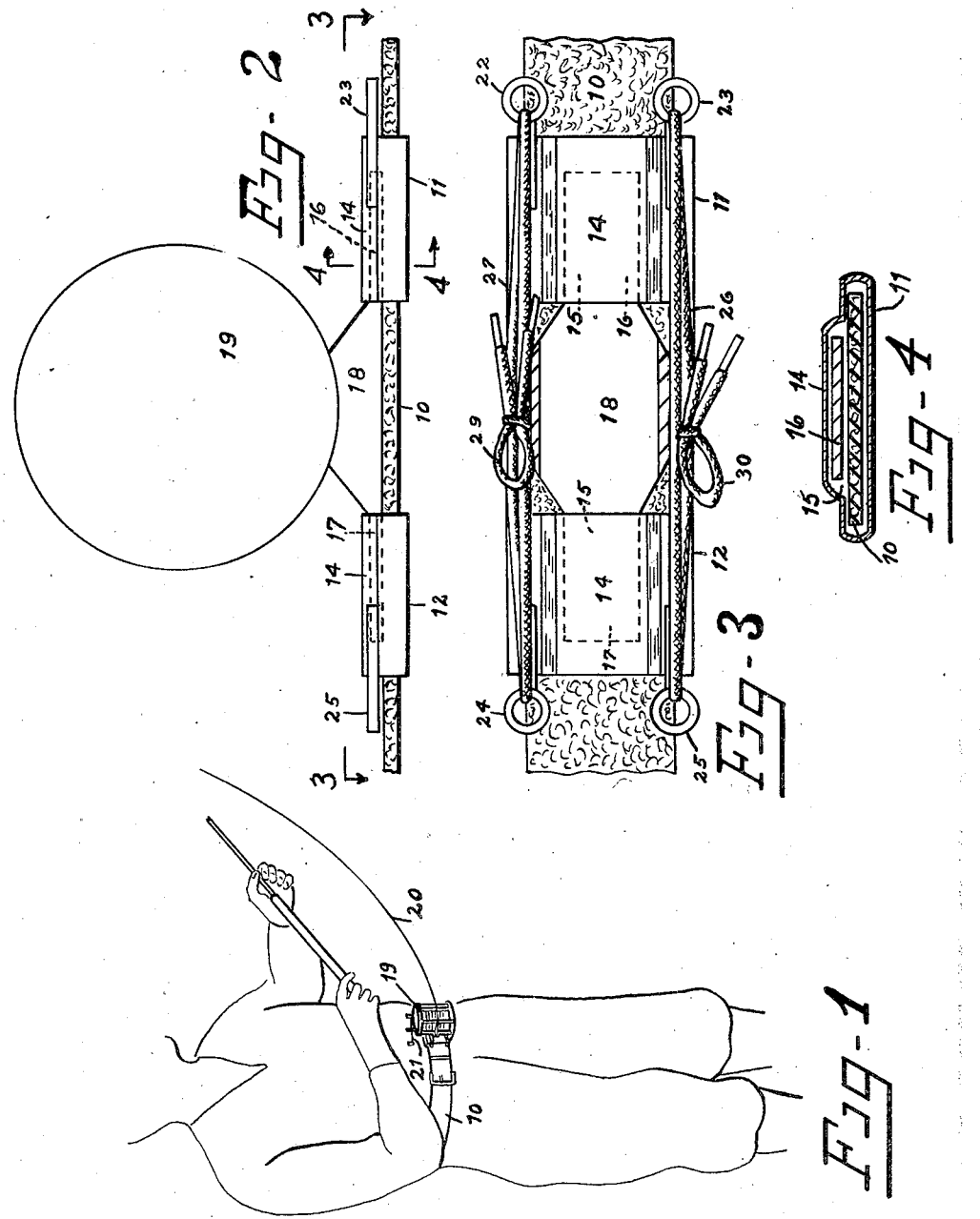
Harry C. Fratt  Inventor Patented Oct. 24, 1944

2,361,189

UNITED STATES PATENT OFFICE 2,361,189

REEL SUPPORTING MEANS

Harry C. Fratt, Norristown, Pa.

Application June 17, 1943, Serial No. 491,147

1 Claim. (Cl. 224—5)

This invention relates to a fisherman's device, and more especially to convenient means for supporting the reel of a rod and reel combination on the belt of the wearer instead of supporting it on the rod itself.

It is a well known fact that in casting with a rod and reel, that the added weight of the reel disposed on the rod interferes with the length of cast and in many instances where one is fishing from piers or boats and the like, in case of the line failing to unreel properly and giving a sudden jerk to the rod and reel, the rod and reel combination is sometimes jerked out of the hand of the fisherman, resulting in loss of both the rod and reel. By providing means for supporting the reel on the belt of the wearer, the rod is then held in the hands of the fisherman and by thus relieving much of the weight of the rod and reel combination, much better casting can be effected by the rod without the added weight of the reel thereon.

Some of the objects of the invention having been stated, other objects will appear as the description proceeds, when taken in connection with the accompanying drawing, in which—

Figure 1 is a perspective view showing the reel in position on the belt of the fisherman;

Figure 2 is an elevation of the reel attached to a belt and looking from the lower side of the reel in Figure 1;

Figure 3 is a sectional plan view taken along the line 3—3 in Figure 2;

Figure 4 is a cross-sectional view taken along the line 4—4 in Figure 2.

Referring more specifically to the drawing, the numeral 10 indicates an ordinary belt which is usually employed for supporting the trousers of the fisherman. This belt before it is passed around the waist of the fisherman is fed through a pair of slidable members 11 and 12. These members are slidably mounted on the belt 10, and each of these members has a forwardly or outwardly projecting central portion 14 thus providing a cavity 15 for the reception of the prongs 16 and 17 which extend in opposite direction from the base 18 which supports the reel proper 19. This reel is a conventional reel onto which the line 20 is wound, and has a crank 21 for winding the cord or line 20 onto the reel. The member 11 has eyelet members 22 and 23 on its outer end, and the member 12 has eyelet members 24 and 25 on its outer end, and through these eyelet members, cords or strings 26 and 27 are passed, and after the reel is placed in position into the cavities by having the portions 16 and 17 extending into the cavities 15, the ends of the cord are pulled to urge the members 11 and 12 toward each other into clamping engagement over the base of the reel, and then these cords are tied preferably into bow knots 29 and 30, and thus securely hold the reel in position on the belt of the wearer.

In the drawing and specification, there has been set forth a preferred embodiment of the invention, and although specific terms are employed, they are used in a generic and descriptive sense only and not for purposes of limitation, the scope of the invention being defined in the claim.

I claim:

In a fishing device for supporting from the belt of a fisherman a reel assembly provided with oppositely extending prongs on the base portion, a pair of members slidably mounted on the belt and each slidable member having offset portions to define a cavity disposed between the outer side of the belt and the front side of the slidable members, so that when the slidable members are moved towards each other, they will move over the prongs of the base member, and means extending between and connected to the slidable members for detachably connecting the slidable members together to confine them in a position over the prongs of the reel base to thereby confine the reel on the belt of the fisherman.

HARRY C. FRATT.